March 13, 1934.  A. MUDRICK  1,951,164
VEHICLE SIGNAL
Filed Nov. 17, 1927
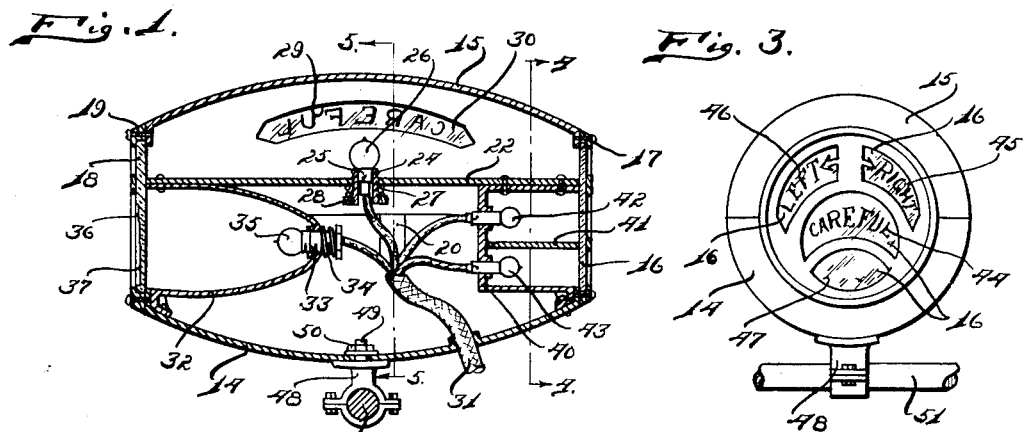
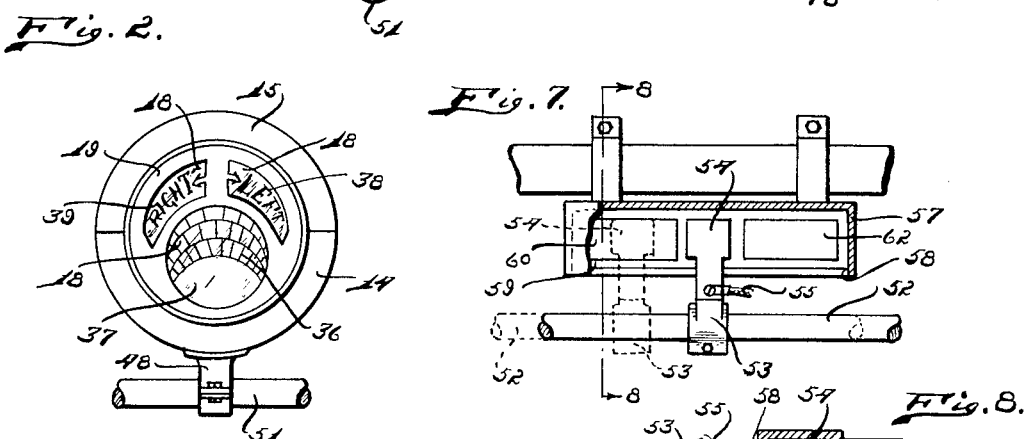
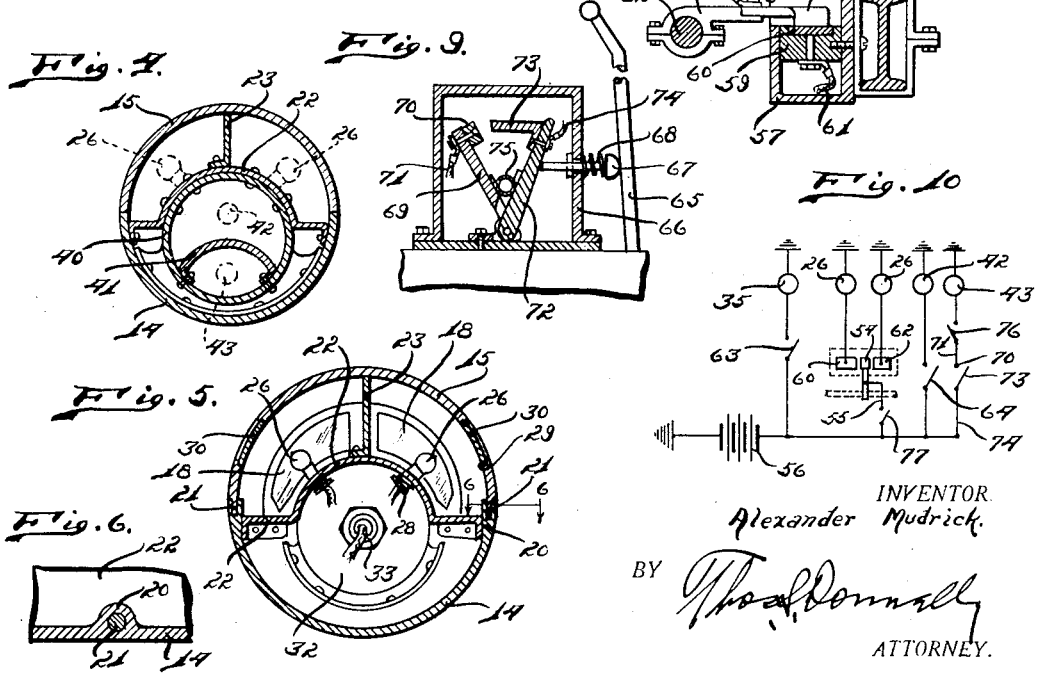
INVENTOR.
Alexander Mudrick.
BY
ATTORNEY.

Patented Mar. 13, 1934

1,951,164

UNITED STATES PATENT OFFICE 1,951,164

VEHICLE SIGNAL

Alexander Mudrick, Detroit, Mich.

Application November 17, 1927, Serial No. 233,819

1 Claim. (Cl. 177—329)

My invention relates to a new and useful improvement in a vehicle signal adapted for use on vehicles for the purposes of indicating to the drivers of following vehicles and to pedestrians the intentions of the driver to alter his course.

It is an object of the present invention to provide a device of this class which will be simple in structure, economical of manufacture, durable and efficient in use, one which is compact, which will serve to indicate both forwardly and rearwardly, and which will, at the same time, be quite ornamental to the vehicle with which used.

Another object of the invention is the provision in a signal of this class of a light directed rearwardly and automatic means for lighting said light upon the preparing of the vehicle for backing up.

Another object of the invention is the provision of means for operating the vehicle signal automatically when the driver makes either a right or a left turn.

Other objects will appear hereinafter.

The invention consists in the combination and arrangement of parts described and claimed.

The invention will be best understood by a reference to the accompanying drawing which forms a part of this specification and in which Fig. 1 is a central vertical sectional view of the housing used in the invention.

Fig. 2 is a front elevational view of the housing.

Fig. 3 is a rear elevational view of the housing.

Fig. 4 is a sectional view taken on line 4—4 of Fig. 1.

Fig. 5 is a sectional view taken on line 5—5 of Fig. 1.

Fig. 6 is a fragmentary sectional view taken on line 6—6 of Fig. 5.

Fig. 7 is a fragmentary side elevational view of a switch used with the invention with parts broken away and parts shown in section.

Fig. 8 is a sectional view taken on substantially line 8—8 of Fig. 7.

Fig. 9 is a sectional view of another switch used in the invention.

Fig. 10 is a diagrammatic view illustrating the wiring used in the invention.

The invention comprises a pair of sections 14 and 15 which, when placed together, form a barrel-shaped housing, the rear end being closed by a transparent or translucent closure 16 held in position by a retaining ring 17. A transparent or translucent closure 18 is used for the front end of the housing, held in position by the retaining ring 19. The meeting edges of the lower section 14 are slightly enlarged as at 20, and provided with sockets for the reception of a locking pin 21 which projects outwardly from the meeting edges of the upper section 15.

As shown in Fig. 1, the retaining rings 17 and 19 are secured to the sections by means of suitable screws or bolts, thus serving to retain these sections in their cooperative relation.

Mounted on the lower section 14 is a partition 22 which serves to separate the major portion of the lower section 14 from communication with the section 15. A longitudinally extending partition 23 is secured to the periphery of the partition 22 and serves to divide the upper section 15 into a pair of non-communicating compartments.

The mounting of the light bulb in each of the compartments at opposite sides of the partition 23 is the same so that a description of one only is given.

Threaded into an opening formed in the partition 22 is a sleeve 24 which serves as a support for the socket 25 in which engages the light bulb 26. A spring 27 engages at one end the partition 22 and at the other end a collar 28 on the sleeve 24, so that an adjustment of the socket relatively to the partition 22 may be effected. An elongated arcuate opening 29 is formed in the wall of the section 15 and closed by a suitable closure 30 which may be either transparent or translucent, and upon which is mounted indicating media, preferably in the nature of words. The socket 25 is connected by suitable wiring to a source of electrical energy, a cable 31 extending outwardly from the housing for this purpose.

Mounted below the partition 22, at the front end of the housing, is a reflector 32 in which is threaded a socket 33, embracing which is a spring 34 to normally prevent this socket from rattling or moving unduly. A light 35 is positioned in the socket 33 and the transparent closure in front of the reflector 32 is stepped to different thicknesses, as shown in Fig. 1, these steps being divided by transversely extended scorings 36 formed in the closure 18.

As shown in Fig. 2, the lower portion 37 of the closure is not provided with the scorings or corrugations 36. The purpose of stepping the closure and providing it with scorings 36 is to eliminate the glare usually present in such devices, the lower portion 37 being left plain as the rays emanating therefrom would not be bothersome. The closure 18, at one side of the partition, is provided with indicating media 38 indicating an intended turn in one direction, and at the opposite side, indicating media 39 are mounted to indicate an intended turn in the opposite direction.

Mounted on the face of the section 14 and on the inner surface of the partition 22 is a housing 40 having the partition 41 therein for dividing the same into a pair of non-communicating compartments. Mounted in a socket projecting into the housing 40 above the partition 41 is a light bulb 42 and a light bulb 43 projects into the compartment below the partition 41.

The closure 16 is provided, opposite the compartment above the partition 41, with indicating media 44, and above the partition 22 at one side of the partition 23, with indicating media 45, and at the other side of the partition 23, with indicating media 46. The space 47 below the partition 41 is left free from any indicating matter so that the light rays emanating therefrom may be used for illuminating purposes, as hereinafter explained.

A bracket 48 is provided with a threaded stud 49 which projects into the lower section 14 and upon which is threaded a nut 50, the bracket 48 being mounted upon a suitable supporting portion 51 of a vehicle with which used, the portion 51 being a cross bar commonly extended transversely of the vehicle and forming a part of the bumper support.

The light bulbs 26 which are positioned at opposite sides of the partition 23, are lit by the closing of a switch automatically upon the turning of the vehicle in either direction.

Mounted on the connecting rod 52 which serves to connect the steering knuckles to the steering post, is an arm 53, preferably formed from insulating material and carrying at its end a contact 54 which is connected by the wire 55 to the battery 56, or in any other suitable source of energy. This contact 54 is positioned in a housing 57 having a slot 58 formed therein. Positioned in the housing is an insulating block 59 carrying on its upper surface a contact 60 connected by a cable 61 to one of the lights 23. A similar contact 62 is mounted on the block 59 and connected to the other light 23, these contacts being spaced apart.

The construction and arrangement is such that as the connecting rod 52 is moved into one position, as shown in dotted lines in Fig. 7, the circuit will be closed to one of the lights 26, and when moved to a corresponding position in the reverse direction, the circuit to the other light 26 will be closed, thus automatically indicating the turn to be made at the beginning of the same.

A suitable switch 63 controls the circuit to the light bulb 35 and a suitable switch 64 controls the circuit to the light bulb 42.

The light bulb 43 is intended to illuminate rearwardly of the vehicle upon the shifting of the gear lever into reverse position, so that the driver of the vehicle may have a means of illuminating rearwardly of the vehicle, when desired.

Positioned in close proximity to the gear shift lever 65 is a housing 66, projecting outwardly from which is a plunger 67 normally held by the spring 68 in outwardly pressed position. Fixedly mounted on the housing 66 is an arm 69 carrying a contact 70 connected by the wire 71 to a suitable source of electrical energy. An arm 72 is rockingly mounted in the housing 66 and provided with a contact 73 connected by the wire 74 to the light bulb 43. A spring 75 serves to normally retain the arms 72 and 69 in spaced relation, as shown in Fig. 9.

Upon the movement of the gear shift lever 65 into reverse position the plunger 69 will be, against the compression of the spring 68, thrust inwardly so as to rock the arm 72 sufficiently to bring the contact 73 into engagement with the contact 70, and thus close the circuit leading to the light 43.

With such an arrangement it is apparent that an automatic lighting of the light bulb is effected.

An auxiliary switch 76 is provided so that when desired the closing of the circuit by the contacts 73 and 70 may be prevented. An auxiliary switch 77, which may be positioned in any desired location, is also provided for opening the circuit leading to the contact 54.

With a vehicle signal constructed in this manner it is believed obvious that the advantages sought are attained, and that a vehicle signal is provided which affords the maximum amount of protection, and universally indicates in all directions, both to the drivers of following and approaching vehicles, as well as to pedestrians, the intentions of the driver of the vehicle.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A vehicle signal of the class described, comprising: a barrel shaped housing split axially to provide a pair of substantially equal semi-barrel shaped sections, said sections engaging each other at their edges; an axially directed partition having its longitudinal edge portions directed diametrically and the central portion thereof being formed arcuate; a flange on the longitudinal edge portion of said partition engaged and secured to the inner surface of one of said sections adjacent its edge the arcuate portion projecting outwardly beyond said edge into the other of said sections; an axially directed radially projecting partition secured to the central portion of said arcuate portion and engaging at its free edge the inner surface of the other of said sections, said partitions dividing said housing into a plurality of compartments, each of said sections at said compartments having an opening formed therein; a transparent closure at each of said openings and a light bulb in each of said compartments.

ALEXANDER MUDRICK.